Dec. 11, 1951 W. A. BEDFORD, JR 2,578,639
FASTENING DEVICE
Filed Dec. 2, 1949

INVENTOR:
WILLIAM A. BEDFORD JR.,
BY John Todd
ATTORNEY.

Patented Dec. 11, 1951

2,578,639

UNITED STATES PATENT OFFICE 2,578,639

FASTENING DEVICE

William A. Bedford, Jr., North Scituate, Mass., assignor to United-Carr Fastener Corporation, Cambridge, Mass., a corporation of Massachusetts Application December 2, 1949, Serial No. 130,783

5 Claims. (Cl. 287—93)

1

This invention relates generally to fastening devices, and has particular reference to a rod retaining clip for attaching a push rod to a lever member.

Fastening devices of this general type are commonly used where it is desired to attach a push rod having a right angle journal elbow to a lever member having a journal-receiving opening therein, to change reciprocating motion of the push rod to rotary motion of the lever. Such fasteners are commonly formed of a single piece of sheet metal, and generally comprise a snap-on clip to engage the rod, and a yoke extending therefrom having openings in the yoke arms, so that the yoke may be assembled astride an edge of the lever with the opening in the yoke arms in alignment with the opening in the lever to receive the journal member therethrough. This type of fastener is unsuitable for certain applications, such as where the opening in the lever is relatively far from an edge, which would require excessively long yoke on the fastener, or where it is desired that the journal be capable of rotating 360 degrees or more relative to the lever, which would be prevented by the portion of the fastener connecting the yoke arms. Another disadvantage of this type of fastener is that in many applications it is necessary to provide both right and left hand fasteners, for example where rods are to be assembled on both sides of the lever. This requires that two different types of fasteners be available during the assembly operation, which is inconvenient and expensive.

The object of the invention is to provide a rod-retaining clip for retaining an elbow journal of a push rod in an opening in a lever, in which the retaining clip is shaped and arranged to allow complete freedom of rotation of the journal relative to the lever.

A further object of the invention is to provide a rod-retaining clip which is adapted to permit assembly of an elbow journal in a journal-receiving opening from either side of the opening.

A further object of the invention is to provide a rod-retaining clip for assembling an elbow journal of a push rod in a journal-receiving opening in a lever, in which the clip has a pair of spaced thrust bearing members for bearing against the lever on opposite sides thereof, said bearing members being joined only by connecting means extending through the journal-receiving opening.

A still further object of the invention is to provide a rod-retaining clip for assembling an elbow journal of a push rod in a journal-receiving opening, in which a rod-engaging portion of a clip is provided with a thrust-bearing portion extending therefrom which is adapted to pass through the journal-receiving opening during assembly of the clip for bearing against the opposite side of the lever.

Other objects of the invention will, in part, be obvious, and will, in part, appear hereinafter. For a fuller understanding of the nature and objects of the invention, reference should be had to the following detailed description, taken in conjunction with the accompanying drawing, in which.

Figure 1:
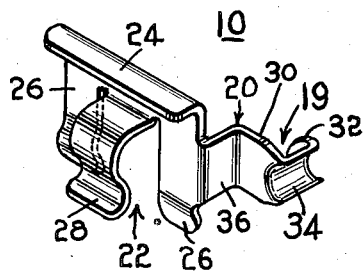
Fig. 1 is a perspective view of a rod-retaining clip embodying the features of the invention.

Referring to the drawing, there is illustrated a rod-attaching clip 10, which is adapted to retain an elbow journal 12 of a push rod 14 in a journal-receiving opening 16 of a lever member 18.

The clip 10 is preferably formed of a single piece of sheet metal, and comprises a lever-engaging portion 19 formed from a projecting arm 20 and a rod-engaging portion 22 comprising a base 24 having a pair of legs 26 extending therefrom, and a spring arm 28 disposed on the base and extending outwardly therefrom in spaced relation to the legs 26 to receive the rod 14 therebetween in snapping engagement. The lever-engaging portion 20 comprises an inner thrust-bearing member 30, and an outer thrust-bearing member 32 which are adapted to bear against opposite sides of the lever 18. The thrust bearings 30 and 32 are spaced apart by a connecting member 34 which is adapted to extend through the opening 16 in the lever when the fastener is assembled therein, and in the preferred form, the connecting member is concave to conform to the shape of the journal-bearing portion 35 formed by the opening 16 for a purpose to be hereinafter described.

To maintain the assembled rod spaced apart from the lever to prevent interference therebetween during operation of the device, the lever-engaging portion 20 is attached to the rod-engaging portion 22 by a spacer arm 36, which extends outwardly in a direction substantially normal to the axis of the assembled rod, and connects to the inner thrust-bearing member 30.

In the preferred embodiment, the outer thrust bearing 32 is formed by bending the end of the arm 20 so that it extends substantially normal to the connecting member 34, and the bearing 32 is formed to be of such a size as to allow it to be inserted through the opening 16 in the lever 18 during assembly.

Figure 2:
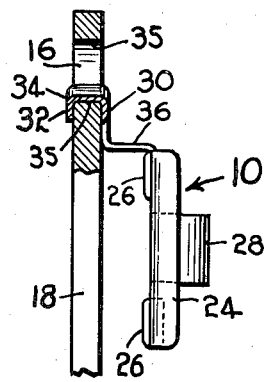
Fig. 2 is a side view of the rod-retaining clip illustrated in Fig. 1 assembled in a lever member, shown partly in section.

Referring to Fig. 2, there is illustrated the fastener 10 assembled in position in the lever member for receiving the journal 12 of the rod 14. The outer thrust bearing 32 has been inserted through the opening 16 so that the bearing members 30 and 32 are disposed on opposite sides of the lever, with the connecting member 34 extending through the opening.

Figure 3:
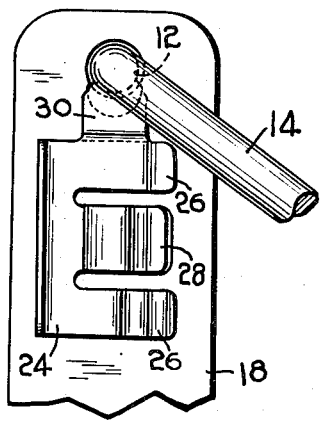
Fig. 3 is a plan view of Fig. 2, with a push rod in position for final assembly.
Figure 4:
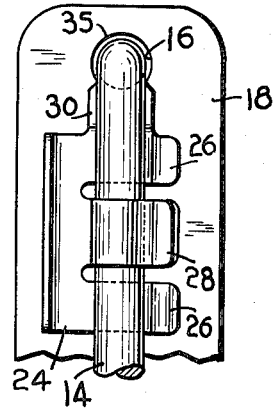
Fig. 4 is a plan view similar to Fig. 3 in which the push rod is completely assembled.
Figure 5:
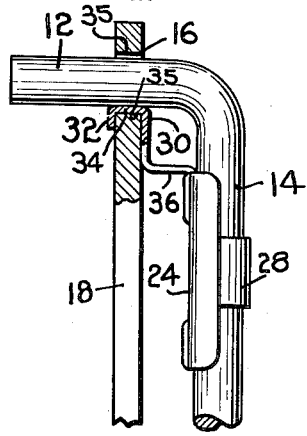
Fig. 5 is a side view, partly in section, of the assembly of Fig. 4.
Figure 6:
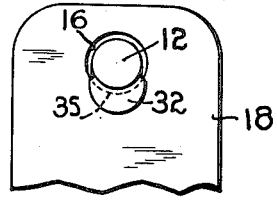
Fig. 6 is a plan view of the assembly of Fig. 5 as seen from the left side.

The elbow journal 12 is then inserted into the opening 16 so that the rod 14 is in position to be snapped into engagement with the lever-engaging portion 20, as illustrated in plan in Fig. 3, and assembly operation is completed by forcing the lever-engaging portion 20 onto the rod so that the rod snaps under the spring arm, to be held in engagement between the arm and the legs 26. (See Figs. 4 and 5.) The concave connecting member 34 is thereby confined between the journal 12 and the journal-bearing portion 35 of the lever to retain the bearing members 30 and 32 in the proper position. The rod is prevented from moving axially relative to the lever by the journal disposed in the opening, and the journal is prevented from axial movement in the opening by the thrust-bearing portions. However, the lever and the journal are capable of any amount of rotary motion relative to each other, since no portion of the attaching clip 10 is disposed about the edges of the lever, but instead, the only connection between the outer and inner thrust bearings is disposed in the opening about which the rotation occurs.

Although the illustrated embodiment of the device is particularly suited for use in applications where it is desired that the rod and lever be easily disassembled, it will be understood that the features of the invention may be embodied in a fastener where the lever and rod are to be more or less permanently assembled. In some cases the inner bearing member need not be formed on the same arm as the outer bearing member, but may be provided by a separate arm, or a portion of the rod-engaging means may also serve as an inner bearing member. The outer bearing member, although shown as a single piece which engages the lever on one side of the journal member, may be provided by other means which bears against the lever circumferentially of the journal, provided the means connecting the outer bearing with the rest of the fastener extends only through the opening, to allow free rotation of the journal relative to the lever.

Since certain other obvious modifications may be made in the device without departing from the scope of the invention, it is intended that all matter contained herein be interpreted in an illustrative, and not in a limiting sense.

I claim:

1. A fastening device for connecting a push rod having a journal portion extending substantially normal to the axis thereof with a lever member having a journal-receiving opening therein, said fastening device comprising a clip portion adapted to detachably engage the push rod adjacent one side of the lever member, and a lever member engaging portion extending therefrom comprising a thrust-bearing portion and a connecting member attaching said thrust-bearing portion to said clip portion, said thrust-bearing portion being of a size and shape to pass through the opening and bear against the opposite side of the lever member.

2. A fastening device for connecting a push rod having a journal portion extending substantially normal to the axis thereof with a lever member having a journal-receiving opening therein forming a journal-bearing portion, said fastening device comprising a clip portion adapted to detachably engage the push rod adjacent one side of the lever member, and a lever member engaging portion extending therefrom comprising a thrust-bearing portion and a connecting member attaching said thrust bearing portion to said clip portion, said thrust-bearing portion being adapted to pass through the opening and bear against the opposite side of the lever member, and said connecting member being adapted to extend through the opening and be disposed between the assembled journal portion of said push rod and the journal-bearing portion.

3. A fastening device for connecting a push-rod having a journal portion extending substantially normal to the axis of the push-rod with a lever member having a journal-receiving opening therein, said fastening device comprising a push-rod engaging portion and a lever member engaging portion extending therefrom, said lever member engaging portion comprising a pair of spaced thrust-bearing portions adapted to be disposed on opposite sides of the lever member, and a connecting member joining the thrust-bearing portions through the opening in the lever member, said bearing portions preventing movement of the push-rod and the journal portion axially of the opening, but permitting free rotation of the journal portion in the opening.

4. A fastening device for connecting a push-rod having an elbow journal forming a journal portion with a lever member having a journal-receiving opening therein, said fastening device comprising a push-rod engaging portion for snap fastener engagement with a portion of the push-rod adjacent the elbow journal, and a lever member engaging portion extending from the push-rod engaging portion, comprising a first thrust-bearing member to bear against the lever member on the side adjacent the push-rod, a second thrust-bearing member of a size and shape to be inserted through the opening in the lever member to engage the lever member on the opposite side, and a connecting portion joining the thrust bearing members through the opening, said connecting portion being the sole means of connecting the thrust bearing members.

5. A fastening device for connecting a push-rod having a journal portion extending substantially normal to the axis of the push-rod with a lever member having a journal-receiving opening extending therethrough forming a journal bearing, said fastening device comprising clip means for detachable engagement with the push-rod, and lever member engaging means disposed thereon, said lever member engaging means comprising a first thrust-bearing portion adapted to bear against the adjacent surface of the lever member, an outwardly extending arm adapted to extend through the opening, and a second thrust-bearing portion disposed on the end of the arm to bear against the opposite side of the lever member, said second thrust-bearing portion being of a size and shape to enable it to pass through the opening during assembly, said arm being adapted to be confined between the journal portion of the rod and the journal bearing.

WILLIAM A. BEDFORD, Jr.

REFERENCES CITED

The following references are of record in the file of this patent:

UNITED STATES PATENTS

| Number | Name | Date |
|---|---|---|
| 597,173 | Adams | Jan. 11, 1898 |
| 1,194,921 | Zeller et al. | Aug. 15, 1916 |
| 2,365,520 | Bogue | Dec. 19, 1944 |